United States Patent
Helminger et al.

(10) Patent No.: US 11,448,946 B2
(45) Date of Patent: Sep. 20, 2022

(54) MOUNTED PROJECTION SYSTEM

(71) Applicant: BSH Hausgeräte GmbH, Munich (DE)

(72) Inventors: Markus Helminger, Bergen (DE); Gerald Horst, Karlsruhe (DE); Philipp Kleinlein, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 16/975,746

(22) PCT Filed: Feb. 25, 2019

(86) PCT No.: PCT/EP2019/054531
§ 371 (c)(1),
(2) Date: Aug. 26, 2020

(87) PCT Pub. No.: WO2019/170448
PCT Pub. Date: Sep. 12, 2019

(65) Prior Publication Data
US 2020/0408414 A1    Dec. 31, 2020

(30) Foreign Application Priority Data
Mar. 7, 2018  (DE) ..................... 10 2018 203 343.9

(51) Int. Cl.
*G03B 21/14* (2006.01)
*G03B 21/16* (2006.01)
(Continued)

(52) U.S. Cl.
CPC ........... *G03B 21/145* (2013.01); *G03B 21/16* (2013.01); *F24C 7/08* (2013.01); *F27D 21/02* (2013.01); *F27D 21/04* (2013.01); *G06F 3/0488* (2013.01)

(58) Field of Classification Search
CPC .............. G03B 21/145; G03B 21/2086; E05B 73/0082; F16M 13/027
See application file for complete search history.

(56) References Cited

U.S. PATENT DOCUMENTS 3,822,049 A * 7/1974 Saunders ................ B60R 11/02
                                                     248/223.41
4,113,217 A    9/1978 O'Connell
(Continued)

FOREIGN PATENT DOCUMENTS

DE    202008004365 U1    8/2008
DE    102009000653 A1    8/2010
(Continued)

OTHER PUBLICATIONS

International Search Report PCT/EP2019/054531 dated May 24, 2019.
National Search Report DE 102018203343.9 dated Nov. 7, 2018.

*Primary Examiner* — Bao-Luan Q Le
(74) *Attorney, Agent, or Firm* — Michael E. Tschupp; Andre Pallapies; Brandon G. Braun

(57) ABSTRACT

An interaction module includes a housing for holding a projector to project an image onto a working surface and an optical scanning device for scanning a gesture in the region of the image, and a mounting plate configured for fastening to an underside of an object attached above the working surface. The mounting plate is configured for attachment of the housing on a side of the mounting plate which side faces away from the object.

16 Claims, 4 Drawing Sheets

(51) Int. Cl.
 *F24C 7/08* (2006.01)
 *F27D 21/02* (2006.01)
 *F27D 21/04* (2006.01)
 *G06F 3/0488* (2022.01)

(56) References Cited

U.S. PATENT DOCUMENTS

| | | | | |
|---|---|---|---|---|
| 4,613,109 A | * | 9/1986 | Boscacci | E05B 73/0082 248/553 |
| 4,712,763 A | * | 12/1987 | Leite | E05B 73/0082 248/553 |
| 4,930,694 A | * | 6/1990 | Yoshitake | B60P 7/13 224/547 |
| 5,288,049 A | * | 2/1994 | Hays | B60R 11/0229 248/298.1 |
| 5,314,162 A | * | 5/1994 | Kelley | E05B 73/0082 248/551 |
| 5,704,660 A | * | 1/1998 | Smith | H04M 1/0249 292/80 |
| 6,042,068 A | * | 3/2000 | Tcherny | F16M 11/08 248/221.11 |
| 7,059,897 B2 | * | 6/2006 | Smith | F16M 11/041 439/527 |
| 7,431,245 B2 | * | 10/2008 | Smith | F16M 13/02 248/27.1 |
| 7,660,577 B2 | * | 2/2010 | Radosta | G06Q 10/08 455/424 |
| 8,186,637 B2 | * | 5/2012 | Walters | F16M 11/12 248/279.1 |
| 9,429,833 B1 | * | 8/2016 | Satoh | G03B 21/26 |
| 2005/0072888 A1 | * | 4/2005 | Smith | F16J 15/3456 248/310 |
| 2005/0082077 A1 | * | 4/2005 | Smith | H04W 4/029 174/50 |
| 2005/0101268 A1 | * | 5/2005 | Radosta | G06Q 10/08 455/115.1 |
| 2007/0258016 A1 | | 11/2007 | Galligan et al. | |
| 2009/0051887 A1 | * | 2/2009 | Chen | G03B 21/145 353/119 |
| 2010/0182136 A1 | | 7/2010 | Pryor | |
| 2011/0089300 A1 | * | 4/2011 | Walters | F16M 11/12 248/274.1 |
| 2014/0292647 A1 | * | 10/2014 | Murase | G03B 17/54 345/156 |
| 2015/0022785 A1 | * | 1/2015 | Kinebuchi | H04N 9/3144 353/52 |
| 2016/0191877 A1 | * | 6/2016 | Ono | H04N 9/3185 348/744 |
| 2018/0063496 A1 | * | 3/2018 | Kasuga | H04N 9/3194 |

FOREIGN PATENT DOCUMENTS

DE 102013200372 A1 7/2014
DE 102014007172 A1 11/2015

* cited by examiner

MOUNTED PROJECTION SYSTEM

CROSS-REFERENCES TO RELATED APPLICATIONS

This application is the U.S. National Stage of International Application No. PCT/EP2019/054531, filed Feb. 25, 2019, which designated the United States and has been published as International Publication No. WO 2019/170448 A1 and which claims the priority of German Patent Application, Serial No. 10 2018 203 343.9, filed Mar. 7, 2018, pursuant to 35 U.S.C. 119(a)-(d).

BACKGROUND OF THE INVENTION

The invention relates to an interaction module. In particular the invention relates to an interaction module for controlling an appliance by means of a gesture relating to an image projected onto a working surface.

An interaction module is designed to project an image onto a working surface and to evaluate a user's gesture relating to the image. The image can comprise in particular the representation of a button or similar element. The user touches the button, for example with a finger, to initiate a predetermined control. For example an appliance in the region of the working surface or a light can be switched on or off. The interaction module can be used in a household context, in particular in a kitchen. Representations other than the button can also be projected onto the working surface, for example a written recipe or a video stream.

DE 10 2009 000 653 B4 describes an apparatus for operating an electronic device by means of gesture recognition.

The interaction module can generally be attached to the underside of a wall cupboard, so that it is located above the working surface. Particularly when used in a potentially soiled region such as a kitchen, it should be cleaned from time to time, to which end it should be removed from the wall cupboard. It may also be necessary to remove it in order to maintain the appliance, for example to replace an air filter.

BRIEF SUMMARY OF THE INVENTION

One object of the present invention is to provide an improved interaction module, which can be attached below a mounting surface and removed again therefrom more efficiently. The invention achieves this object by means of the subject matter of the independent claim. Preferred embodiments are set out in subclaims.

An interaction module is designed to project an image onto a working surface and to scan a gesture in the region of the image. For this purpose the interaction module comprises a housing for holding a projector for projecting the image and an optical scanning device for scanning the gesture. Also provided is a mounting plate, which is designed to be fastened to the underside of an object attached above the working surface and to attach the housing on a side facing away from the object.

The mounting plate can be attached to the object without the housing, for example by means of screws, thereby simplifying mounting. The mounting plate and housing can be tailored more effectively for one another, to allow secure retention and simple release or attachment. Properties of the materials used or existing shapes can be used advantageously here.

The mounting plate and housing can be designed to be separated from or attached to one another without tools. This allows a user to clean or maintain the interaction module more easily. In particular it is possible to comply more easily with hygiene requirements, in particular when used in a kitchen, where the interaction module can be exposed to soiling by different gases or liquids. This can extend the useful life of the interaction module.

The mounting plate and housing can be designed to enter into a form-fit engagement acting in the direction of the working surface. This ensures secure and resilient retention. The establishing or release of the form-fit connection can generally be readily perceived by an operator, thereby preventing incorrect mounting. Inadvertent release of the interaction module can be more easily prevented.

The mounting plate preferably extends in one plane that preferably runs parallel to the working surface and can have a hooked segment extending in the direction of the housing. The housing here can have a holder corresponding to the hooked segment, so the housing can be made to enter into the form-fit engagement or be released therefrom by a movement running parallel to the working surface relative to the mounting plate.

A number of hooked segments with a number of respectively corresponding holders can also be provided. In particular the mounting plate can be essentially rectangular and a hooked segment can be provided at each corner. The number and arrangement of the hooked segments can be freely selected. The arrangement can be configured such that the housing cannot be attached with an incorrect orientation. The hooked segments can also be used to guide the housing before or during the relative movement. This allows the housing to be threaded in or out of the hooked segments of the mounting plate more easily.

The interaction module can also have a locking facility, which is designed to prevent inadvertent release of the housing from the mounting plate. When used in a kitchen in particular, possibly in the region of a cooker, this can prevent the interaction module being released and falling for example into food that is currently being prepared. The locking facility can also hold the housing securely on the mounting plate when the housing is wiped with a damp cloth for example. The benefit of the interaction module can be increased by the more secure retention.

The locking facility can comprise a vertically movable bolt attached to the housing, the mounting plate having a contact edge extending in a vertical direction to engage with the bolt. The housing can be made of plastic, in particular by injection molding or a similar freeform method. This allows a guide arm of the bolt to be configured easily and the bolt can be manufactured for example as a separable element together with the housing.

The contact edge can be formed on the delimitation of a cut-out in the mounting plate. For example the mounting plate can have a cut-out for holding the bolt. The mounting plate can be made from a relatively thin metal sheet, so the contact edge can also be only small in dimension initially in one direction. It is therefore preferable for a segment of the mounting plate to be bent downward in the region of the cut-out to enlarge the contact surface. The segment and cut-out can be brought about together as a notch. The segment can optionally be bent at an angle, to facilitate automatic locking when the housing is inserted into the mounting plate but requiring actuation of the bolt for release.

The locking facility can be held in a locking position by means of an elastic element. Manual actuation allows the bolt to be moved to an unlocked position to remove the housing from the mounting plate. The elastic element can comprise a spring or be embodied as a further plastic part.

In particular the elastic element can be configured as a single piece in the form of a segment on the housing or bolt. This makes the structure more economical and suitable for everyday use.

In one preferred embodiment a socket is arranged near to the locking facility, working in conjunction with an electrical lead plugged into it to prevent actuation of the locking facility. This means that the housing of the interaction module can only be mounted on the mounting plate or removed therefrom when the lead is unplugged. This is particularly advantageous if the lead furnishes the power supply for the interaction module. The lead particularly preferably has an angular plug, which, when plugged in, covers the center of a bolt of the locking facility with its angled region. As a result the bolt is no longer freely accessible and a user of the interaction module is thus prevented from actuating the bolt. To ensure that the angular plug is positioned correctly, in one preferred configuration the socket and plug have a corresponding, polygonal shape.

It is advantageous if the position of the electrical lead is fixed by a guide element so that it runs directly in front of the locking facility. The guide element here can be a cut-out in a part of the mounting plate projecting beyond the housing of the interaction module. The electrical lead runs through this cut-out and is aligned in a straight line between socket and cut-out as a result. Such a configuration also allows the use of circular sockets, for example jack sockets.

The mounting plate can be made from a single flat metal sheet. This allows the mounting plate to be produced quickly and economically. The processing of a metal sheet can comprise bending and dividing or separating operations, in particular by means of punching. The metal sheet can be protected against corrosion, for example by coating or galvanizing or by being made from a light alloy. The economical mounting plate means that a number of mounting plates can be used alternately in a workplace, in particular in a kitchen, in that a user can insert the interaction module into one of a number of appropriately attached mounting plates.

The mounting plate can preferably be produced as a single piece. This dispenses with the need for joining or mounting operations that increase the production costs of the mounting plate.

The mounting plate can have a cut-out to allow a passage of air to or from a ventilation opening in the housing. The interaction module can have a fan for forced ventilation, for example to cool the projector in the airflow. A cut-out in the housing for the passage of air entering or exiting can coincide with a cut-out in the mounting plate to ensure the exchange of air. Alternatively the air can also be guided for example between the mounting plate and the housing to enter or exit at the side. This prevents the passing air soiling the object to which the mounting plate is attached.

The mounting plate can also have a cut-out for the passage of an electrical lead, in order to supply the interaction module for example with electrical energy or to bring about a data interface. One or more further cut-outs can be provided for the attachment of the mounting plate to the object. The cut-outs are preferably provided for fastening by means of screws, it being possible for one or more of the cut-outs also to comprise a slot to allow the interaction module to be positioned or aligned during mounting.

The mounting plate can have a spacer, which projects some distance beyond a contour of the housing when the mounting plate is attached to the housing. The distance here is preferably selected as a function of optical parameters of the projector so that the image generated by the projector on the working surface has no contact with a vertical surface that delimits one side of the working surface and against which the segment rests.

The projector emits a light beam that generates the image on the working surface. An exit direction of the light beam can run asymmetrically in relation to an optical axis, so that the image can also be displayed far from the vertical surface, when the exit region of the projector is nearer to the vertical surface than to the front edge of the working surface. The distance between the interaction module and the working surface lies within a predetermined range, in practice between approx. 30 cm and approx. 150 cm. The protruding length of the segment of the mounting plate can be determined as a function of the radiation direction of the projector and the height of attachment of the mounting plate above the working surface so that the projected image does not strike the vertical surface. This allows a larger region of the working surface to be used for the projected image.

BRIEF DESCRIPTION OF THE DRAWINGS

The invention is described in more detail below with reference to the accompanying figures, in which.

DETAILED DESCRIPTION OF EXEMPLARY
EMBODIMENTS OF THE PRESENT
INVENTION

Figure 1:
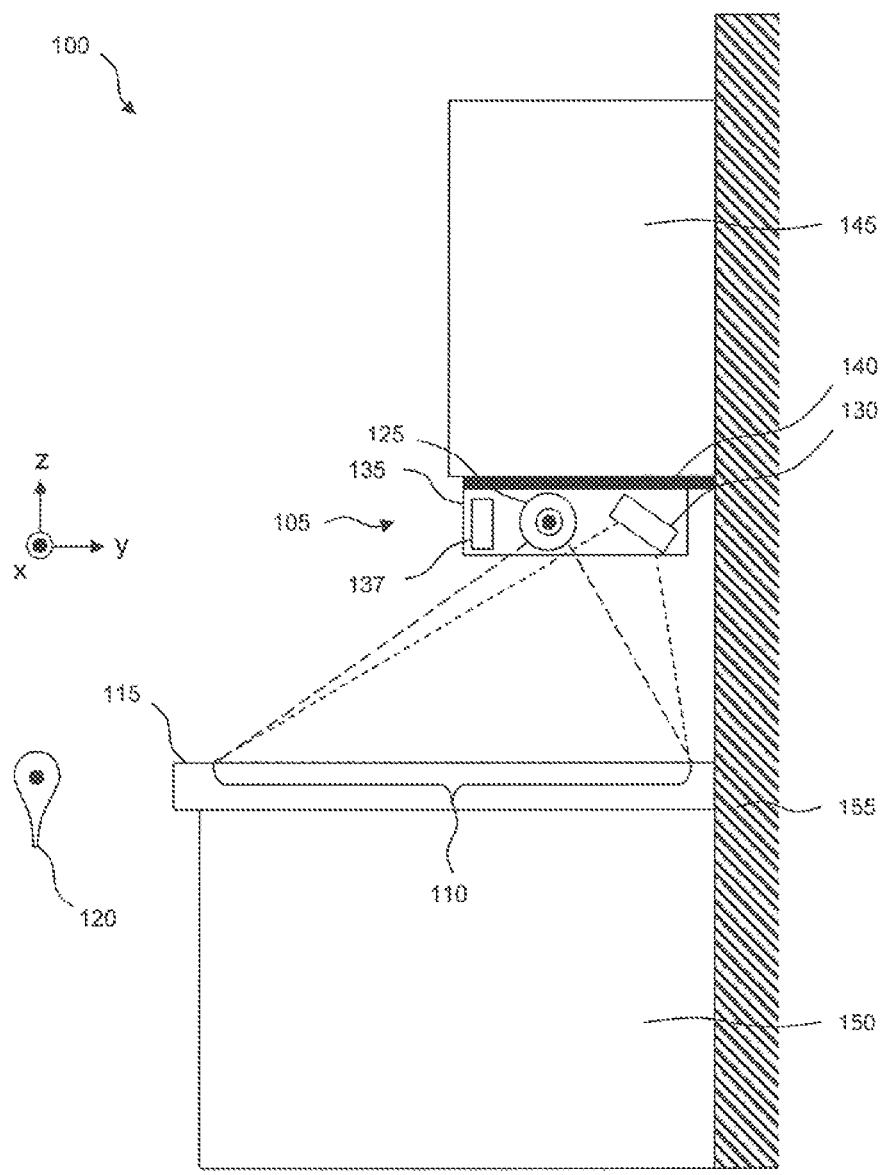
FIG. 1 shows an exemplary system with an interaction module.

FIG. 1 shows an exemplary system 100 with an interaction module 105. The interaction module 105 is designed to project an image 110 onto a working surface 115 and to capture a gesture in the region of the image 110 optically. For this purpose the interaction module 105 is preferably attached above the working surface 115. A user of the interaction module 105 can be located for example in a user position 120 for this purpose, preferably looking in the direction of the interaction module 105.

To facilitate direction referencing, an exemplary coordinates system is shown, which is also used in the following figures. A transverse direction (x) runs across the (imagined) user and to the observer in the representation in FIG. 1. A depthwise direction (y) extends from the user position 120 in the direction of the interaction module. The working surface 115 generally runs horizontally along the transverse direction and the depthwise direction. A vertical direction is also referred to as a heightwise direction (z); it extends vertically upward from the working surface 115. Pairs of directions are perpendicular to one another and the directions preferably form a right-handed coordinate system. The direction designations are irrelevant and a different three-dimensional coordinates system can be used in other embodiments. Directions shown here that are parallel or perpendicular to one of the directions should preferably be seen as fuzzy data so that a substantially parallel or substantially perpendicular direction is also included.

The interaction module 105 in FIG. 1 generally comprises a projector 125 and an optical scanning device 130. The projector 125 is designed to project visible light downward onto the working surface 115 to generate the image 110. Any content can be output optically in this process, for example text, graphics or a video data stream. The scanning device 130 can be configured as a depth camera for example and is designed to capture a gesture in the region of the image 110. For this purpose the scanning device 130 can comprise at least one optical sensor and a light source, which can supply invisible light in particular, for example infrared light. The scanning device 130 is preferably designed to determine a distance from an object by means of a stereoscopic recording by two sensors in different places or by determining the propagation speed of light (time of flight, TOF).

To control a function the image 110 can comprise for example an operating surface or button and the scanning device 130 can capture contact with the working surface (or an object) in the region of the button and output a corresponding signal or execute a control function assigned to the button. The projector 125 and the scanning device 130 can be arranged in different places from one another in the plane of the working surface 115. A projection region of the projector 125 and a scanning region of the scanning device 130 in the region of the working surface 115 can however be matched with one another. In particular the regions on the working surface 115 can be substantially congruent. The projector 125 and/or scanning device 130 can each be inclined about an axis parallel to the working surface 115 for this purpose.

The interaction module 105 preferably comprises a housing 135, which can generally hold the projector 125, the optical scanning device 130 and optionally also further elements, such as a power adapter or a fan 137. The housing 135 can preferably be attached to a mounting plate 140 or removed therefrom without tools. The mounting plate 140 can be attached to an appliance or unit 145 located above the working surface 115. Screws or another common fastening method can be used for this purpose. The appliance can comprise for example a lighting unit or extractor hood and the unit 145 can be configured in particular as a wall cupboard or top cupboard. Other embodiments, in which a shelf, ceiling or dedicated horizontal fastening facility is used instead of the unit 145, are also possible. It is assumed here that the mounting plate 140 can be attached to the underside of any object so that the interaction module is below the mounting plate in the heightwise direction. The underside of the object is generally flat, at least as large as the mounting plate and preferably runs parallel to the working surface 115 for this purpose. The underside of the object can also be perforated, for example for the passage of air or as a guide for an electrical lead.

In the illustrated exemplary embodiment the working surface 115 is held by a bottom cupboard 150. The bottom cupboard 150, the working surface 115 and the unit 145 here are located on a vertical delimitation, which can comprise in particular a wall 155, a room divider or a large unit, on a side away from the user position 120 in the depthwise direction. Such a configuration is not mandatory but is frequently available in a household context and in particular in a kitchen, in which the interaction module 105 can preferably be used.

Figure 2:
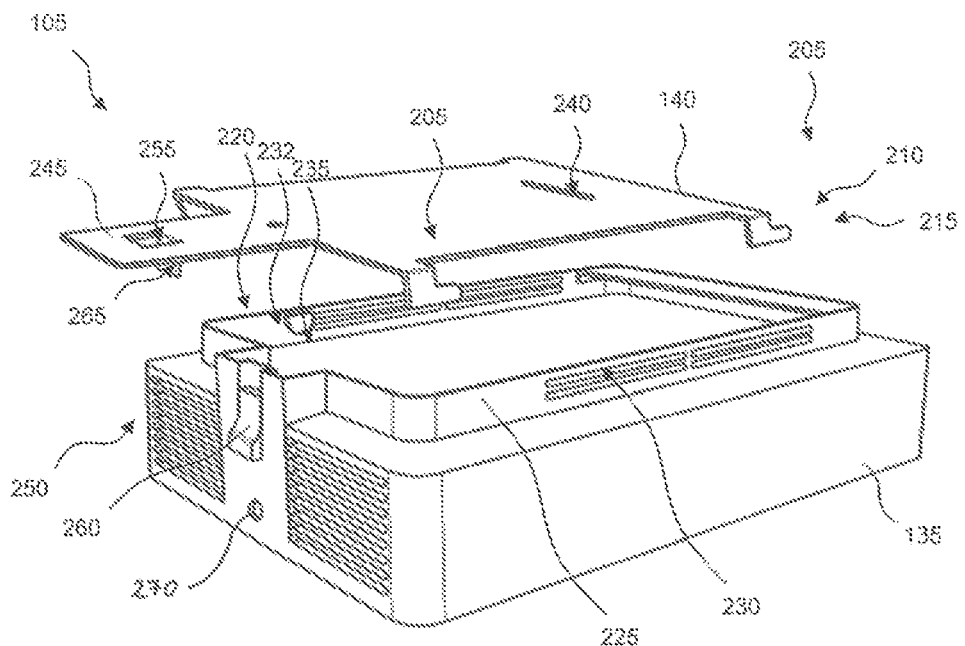
FIG. 2 shows an exemplary interaction module with a mounting plate in two different states.
Figure 2:
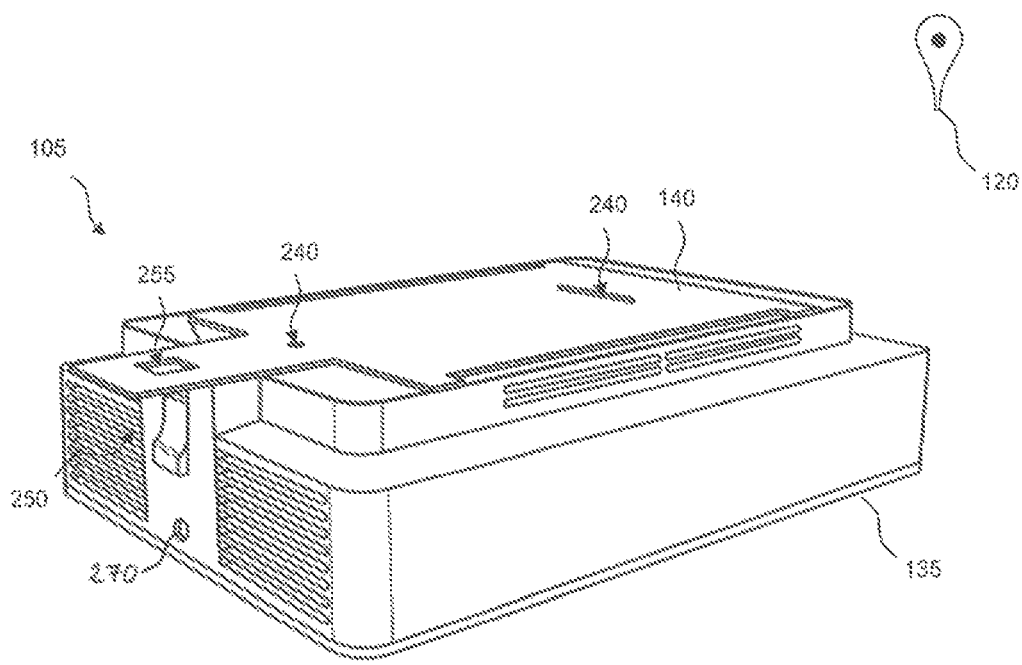

FIG. 2 shows an exemplary interaction module 105 with a mounting plate 140 in two different states. In an upper region of FIG. 2 the mounting plates 140 and housing 135 are shown separated from one another and in a lower region they are shown attached to one another. The mounting plate 140 can preferably be made as a single piece from a flat metal sheet. Here it comprises a flat segment for contact with an object such as the unit or appliance 145 and one or more hooked segments 205. The hooked segment 205 comprises a first segment 210 extending in a heightwise direction and a second segment 215 extending parallel to the working surface 115, all the second segments 215 of all the hooked segments 205 preferably pointing in the same direction, in this instance the direction of the user position 120. In the illustrated exemplary embodiment four hooked segments 205 are provided, located at corners of a rectangle, but other arrangements are also possible.

A corresponding holder 220 of the housing 135 is located opposite a hooked segment 205. In the present embodiment the top of the housing 135 comprises a peripheral vertical web 225 for example for this purpose, which preferably has a cut-out 230 for the passage of air on at least one side. A holder 220 results here in that the web 225 is narrower in one region 232 and a horizontal recess 235 adjoins the narrower region 232. When the interaction module 105 is attached to the mounting plate 140, the first segment 210 is located in the region of the narrower region 232 and the second segment 215 is located in the region of the horizontal recess 235. The web 225 is then on a radial outer side of the hooked segments 205 relative to a vertical center axis. In a different embodiment the housing 135 can engage in a hooked segment 205 differently, for example by means of a reversed hooked element designed to engage with a form fit in the hooked element 205.

The housing 135 can be attached to the mounting plate 140 by first moving it vertically upward so that the hooked elements 205 engage in the corresponding holders 220 and then horizontally so that the second segments 215 engage in the holders 220. Fastening takes place by means of a form fit in a vertical direction between the second segments 215 and the recesses 235. Removal can take place with the sequence of steps reversed.

The mounting plate 140 can have one or more further cut-outs 240 for fastening to the object 145, it being possible for one cut-out 240 in particular to be round and another to be configured as a slot or arm so that the alignment or position of the mounting plate 140 on the object 145 can be adjusted at a later stage, if screws for example have already been inserted into the object 145 through some of the cut-outs 240.

The mounting plate 140 optionally comprises a segment that can be used as a spacer 245 in relation to a vertical delimitation such as the wall 155. The length by which the spacer 245 projects beyond a contour of the housing 135 can be predetermined as a function of optical and/or geometrical parameters or properties of the interaction module 105. This length can also be zero in one embodiment.

A locking facility 250 can be provided between the housing 135 and the mounting plate 140 and this is described in more detail below with reference to FIG. 3. On the mounting plate 140 the locking facility 250 can comprise a cut-out 255 and on the housing 135 a bolt 260. The bolt 260 is preferably embodied so that it can move vertically and designed to engage in the cut-out 255 in a locking position and to release this in an unlocking position. A contact edge of the cut-out 255 against which the bolt 260 rests to prevent horizontal displacement of the housing 135, which cancels the form fit between the hooked elements 205 and the corresponding holders 220, is then reinforced. A vertical contact structure 265 in particular can be configured on the mounting plate 140 for this purpose. This contact structure 265 can be formed by bending part of the mounting plate 140 downward.

Figure 3:
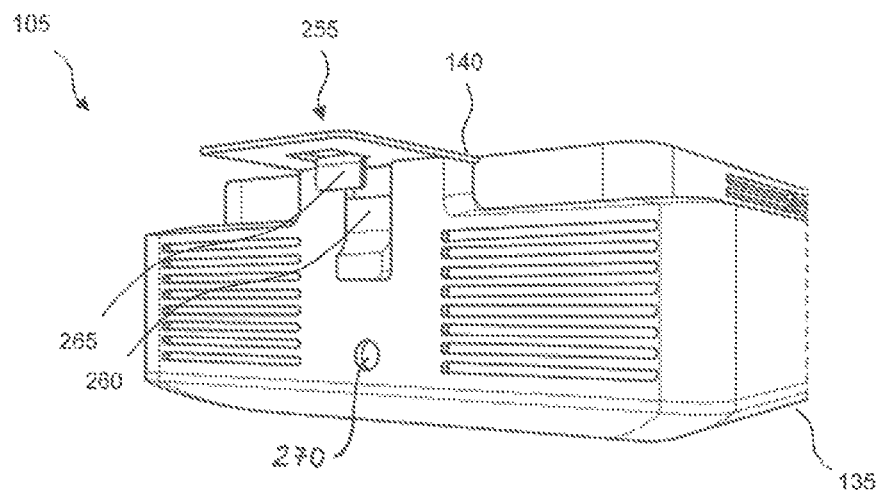
FIG. 3 shows a locking facility of an exemplary interaction module on a mounting plate in two different states.
Figure 3:
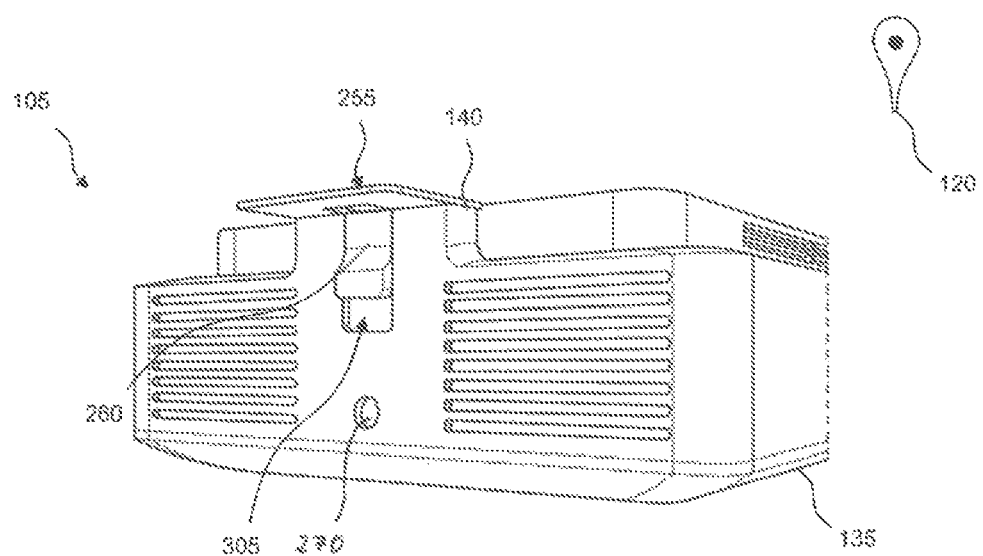

FIG. 3 shows a locking facility 250 of an exemplary interaction module 105 on a mounting plate 140 in two different states. In an upper region of FIG. 3 the bolt 260 is in an unlocking position and the housing 135 is in a position relative to the mounting plate 140 that allows vertical movement. In a lower region the bolt 260 is in a locking position and the housing 135 is latched onto the mounting plate 140, the hooked elements 205 engaging in the corresponding holders 220 with a form fit in a vertical direction.

In the locking position the bolt 260 rests against the contact structure 265 of the mounting plate 140, its form fit preventing any lateral (horizontal) movement in the direction in which the vertical form fit between the hooked elements 205 and the corresponding holders 220 is cancelled.

The bolt 265 can for example be held in such a manner that it can be displaced vertically in a groove or arm on the housing 135. An elastic element 305 can load the bolt vertically upward, in the direction of the locking position. A user must move the bolt 265 downward to unlock. Said user can therefore displace the housing 135 horizontally relative to the mounting plate 140 and then remove the housing 135 in a vertical direction.

An electrical connecting lead for the interaction device (not shown) is passed through the cut-out 255 in the mounting plate 140 and plugged into a socket 270 by means of a right-angle plug arranged at the end of the connecting lead. The socket 270 is arranged centrally below the bolt 260 in a vertical direction and centrally below the cut-out 255 on the housing 135. Therefore when the connecting lead is plugged in, part of the right-angle plug and/or the cable of the connecting lead runs centrally in front of the bolt 260, making this inaccessible for unlocking. It is therefore only possible to unlock the housing 135 from the mounting plate 140 when the connecting lead has been unplugged.

Figure 4:
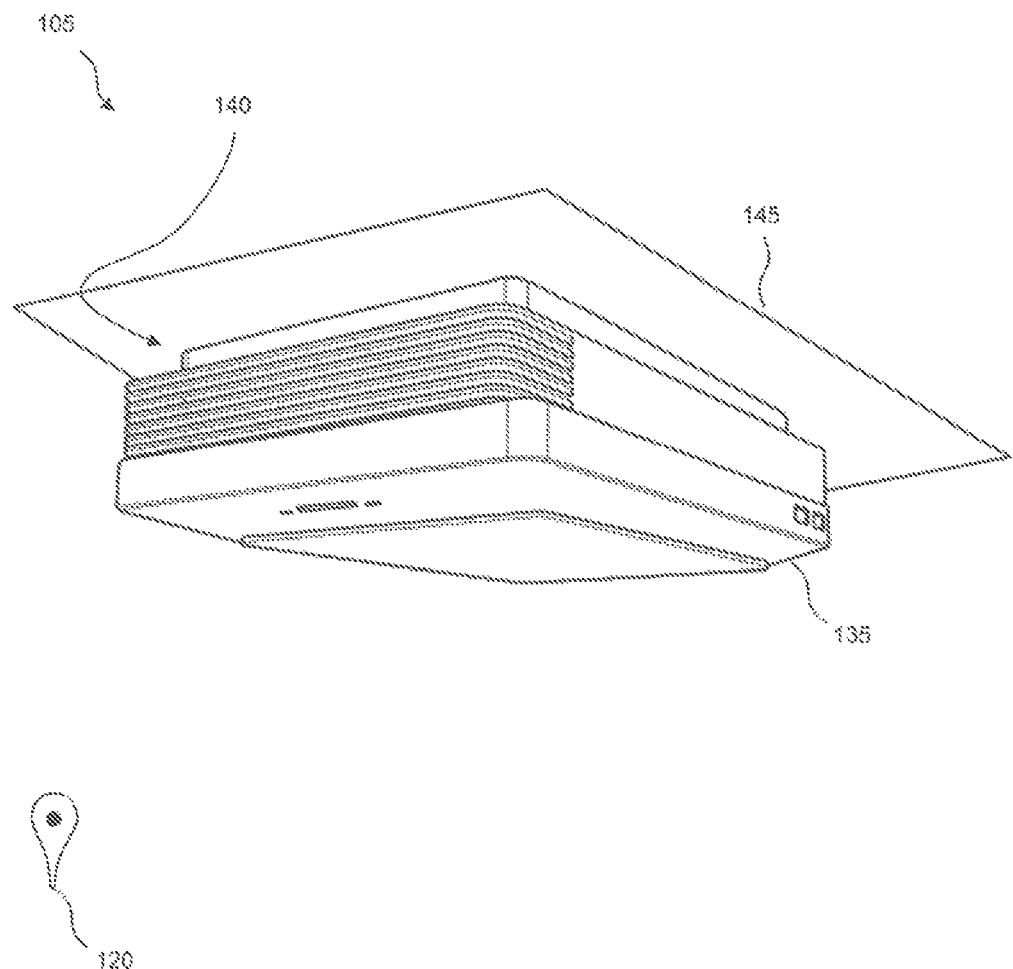
FIG. 4 shows an exemplary interaction module in a mounted position.

FIG. 4 shows an exemplary interaction module in the mounted position on an appliance or unit 145.

The invention claimed is:

1. An interaction module, comprising:
    a housing holding a projector configured to project an image onto a working surface and an optical scanning device configured to scan a gesture in a region of the image; and
    a mounting plate fastenable to an object disposed opposite the working surface, wherein the mounting plate is configured to receive the housing on a side of the mounting plate which faces away from the object;
    wherein the mounting plate comprises an aperture and a vertical tab adjacent the aperture, the tab being configured to engage with a movable latch of the housing to prevent inadvertent release of the housing from the mounting plate; and
    wherein the aperture of the mounting plate is disposed directly above the movable latch, such that the aperture, the latch, and a socket of the projector are in line with each other, and such that a power cord received by the aperture passes directly in front of the latch and blocks access to the latch when coupled to the socket of the projector.

2. The interaction module of claim 1, wherein the mounting plate and housing are structured to be separated from or attached to one another without tools.

3. The interaction module of claim 1, wherein the mounting plate and housing are connected to one another by a form-fit engagement.

4. The interaction module of claim 3, wherein the mounting plate extends in a plane and includes a hooked segment extending toward the housing,
    wherein the housing further comprises a holder corresponding to the hooked segment, such that the housing is connectable to the mounting plate to establish the form-fit engagement by a movement running parallel to the working surface relative to the mounting plate or releasable therefrom by a movement running parallel to the working surface relative to the mounting plate.

5. The interaction module of claim 1, further comprising an elastic element configured to hold the latch in a locking position.

6. The interaction module of claim 1, wherein the mounting plate is made from a single flat metal sheet.

7. The interaction module of claim 1, wherein the mounting plate is produced as a single piece.

8. The interaction module of claim 1, wherein the mounting plate has a cut-out to allow passage of air to or from a ventilation opening in the housing.

9. An interaction module, comprising:
    a housing holding a projector configured to project an image onto a working surface and an optical scanning device configured to scan a gesture in a region of the image; and
    a mounting plate fastenable to an object disposed opposite the working surface, wherein the mounting plate is configured to receive the housing on a side of the mounting plate which faces away from the object, the housing being selectively coupled to the mounting plate by a movable latch;
    wherein the mounting plate comprises an aperture and a vertical tab adjacent the aperture, the tab being configured to engage with the movable latch to prevent inadvertent release of the housing from the mounting plate; and
    wherein the aperture is configured to be aligned with the latch and a socket of the projector when the tab and the latch are engaged, such that a power cord passing through the aperture blocks access to the latch when coupled to the socket of the projector.

10. The interaction module of claim 9, wherein the mounting plate and housing are structured to be separated from or attached to one another without tools.

11. The interaction module of claim 9, wherein the mounting plate and housing are connected to one another by a form-fit engagement.

12. The interaction module of claim 11, wherein the mounting plate extends in a plane and includes a hooked segment extending toward the housing,
    wherein the housing further comprises a holder corresponding to the hooked segment, such that the housing is connectable to the mounting plate to establish the form-fit engagement by a movement running parallel to the working surface relative to the mounting plate or releasable therefrom by a movement running parallel to the working surface relative to the mounting plate.

13. The interaction module of claim 9, further comprising an elastic element configured to hold the latch in a locking position.

14. The interaction module of claim 9, wherein the mounting plate is made from a single flat metal sheet.

15. The interaction module of claim 9, wherein the mounting plate is produced as a single piece.

16. The interaction module of claim 9, wherein the mounting plate has a cut-out to allow passage of air to or from a ventilation opening in the housing.

* * * * *